Patented Feb. 24, 1942

2,274,588

UNITED STATES PATENT OFFICE 2,274,588

STABLE RUBBER HYDROCHLORIDE

William C. Calvert, Cuyahoga Falls, Ohio, assignor to Wingfoot Corporation, Wilmington, Del., a corporation of Delaware No Drawing. Application November 30, 1934, Serial No. 755,389. In France January 19, 1934

2 Claims. (Cl. 260—735)

This invention relates to improvements in rubber hydrochloride films, composed essentially of rubber hydrochloride which is free from hydrogen chloride (hydrochloride acid) and which in addition contains alkaline material homogeneously dispersed in the rubber hydrochloride in amount sufficient to completely neutralize hydrogen chloride which may be formed in the film by decomposition and thereby maintain a non-acid condition in the film, the alkaline material being insufficiently alkaline to react with the rubber hydrochloride or remove hydrogen chloride therefrom.

Rubber which is completely saturated with hydrogen chloride is brittle. Rubber partially saturated with hydrogen chloride, that is rubber which is approximately 85 to 90% saturated and contains, for example 29–30.5% chlorine is flexible and such a rubber hydrochloride will ordinarily be preferred for the preparation of films such as here described.

The rubber hydrochloride may be prepared by treating a solution or suspension of rubber in a suitable solvent such as chloroform with hydrochloric acid gas until the desired saturation is obtained, and then neutralizing any excess hydrochloric acid and washing as desired. A typical example follows:

Twenty pounds of plasticized pale crepe rubber are dissolved in about 313 pounds of benzene, giving a rubber cement of approximately 6% concentration. Commercial benzene containing up to 0.1% of water may be used. Dehydrated benzene gives a somewhat lighter colored film, although in either case a substantially colorless film may be obtained. The cement is preferably cooled to about 10° C. and hydrogen chloride gas introduced, the cement being meanwhile agitated. The hydrogen chloride may be introduced at a higher temperature if desired, for example, at room temperature, but it is preferable to carry out the reaction at about 10° C., as the gas is more readily dissolved in the cement at this temperature. After passing the gas into the solution for about six hours, the increase in weight of the composition due to the introduction of hydrogen chloride should be approximately 11.6 pounds which corresponds to a slight excess of available hydrogen chloride over that theoretically required by the empirical formula $(C_5H_9Cl)_x$, and when this increase in weight has been effected the introduction of hydrogen chloride gas into the cement is advantageously discontinued. If more hydrogen chloride is introduced the time required for the reaction of the hydrogen chloride and rubber is shortened but in most commercial operations this will not be advantageous.

The hydrogen chloride dissolved in the cement is allowed to react with the rubber at room temperature until a washed and dried sample indicates that the desired hydrochlorination has been effected. Generally about 20 hours will be required to produce 80 to 90% saturation of the rubber. Introducing an excess of hydrogen chloride ranging upward to about 50% over that theoretically necessary to obtain the desired partial saturation of the rubber is helpful in achieving the desired change in the rubber in a somewhat shorter time, but in general a prolonged period of standing will be found to be necessary. The test for completion of the desired saturation may be an analysis for chlorine or an empirical test such as a determination of the viscosity of the rubber hydrochloride or a determination of the stress/strain properties of a film prepared from the reaction product or a visual and manual examination of a film prepared from the mass to determine whether or not it is tacky or brittle on drying.

After the desired partial saturation has been achieved, the excess hydrogen chloride may be neutralized with ammonia or other alkali and the alkaline material added directly to the neutralized solution. A somewhat clearer product is obtained if water-soluble materials are removed from the rubber hydrochloride. This may be done by washing the rubber hydrochloride with water on a rubber mill.

Other methods may be employed for removing the excess hydrogen chloride, one being to bubble nitrogen through the reacted cement, the nitrogen taking the free hydrogen chloride with it. Another is to employ selective solvents. In some cases, it may be found desirable to remove the hydrogen chloride by precipitating it out as a salt. Still other methods of purification may be utilized if desired.

According to a preferred method of preparing a film, the reacted cement, after standing a sufficient time to effect the desired hydrochlorination of the rubber is subjected to steam distillation to remove the solvent and excess hydrogen chloride. The resulting mass of the partially saturated rubber hydrochloride is then broken up on a rubber washer, washed thoroughly with water to remove any remaining hydrogen chloride and water soluble material and dried in a vacuum drier at approximately 160° F. The dried product is then dissolved in chloroform, about 20 parts of solvent to one part of the rubber hydrochloride being satisfactory. Other solvents, for example, benzene, may be employed if the materials are heated. Solvents such as dichlorethylene may be used without heating. To the resulting solution is added 1% or 2% up to 5% or more of alkaline compounds which will homogeneously disperse therein such as hexamethylene tetramine, dicyclohexylamine, cyclohexylamine-formaldehyde, di-tetrahydrofurfuryl amine, and diphenyl guanidine such as

| | Per cent |
|---|---|
| Hexamethylene tetramine | 1½ |
| Methylene amino acetonitrile | 3 |
| Hexamethylene tetramine | 1 |
| Ditetrahydro furfurylamine | 1 |
| Hexamethylene tetramine | 1 |
| Dicyclohexylamine | 3 |
| Hexamethylene tetramine | 1½ |
| Dicyclohexylamine | 1 |
| Ditetrahydro furfurylamine | 1 |

The solution is then spread on a nitrocellulose or other suitable surface, forming a clear colorless film which is free from hydrogen chloride and which contains an alkaline material, such as those referred to, homogeneously dispersed therein in amount sufficient to neutralize hydrogen chloride which may form in the film by decomposition and to maintain the film free from acid, but which is insufficiently alkaline to react with the rubber hydrochloride or remove hydrogen chloride from it.

I claim:

1. A transparent film composed essentially of rubber hydrochloride which is free from hydrogen chloride (hydrochloric acid) and which in addition contains alkaline material homogeneously dispersed in the rubber hydrochloride in amount sufficient to completely neutralize hydrogen chloride which may be formed in the film by decomposition and thereby maintain a non-acid condition in the film, said alkaline material being insufficiently alkaline to react with the rubber hydrochloride or remove hydrogen chloride therefrom.

2. A transparent film composed essentially of rubber hydrochloride which is free from hydrogen chloride (hydrochloric acid) and which in addition contains organic alkaline material homogeneously dispersed in the rubber hydrochloride in amount sufficient to completely neutralize hydrogen chloride which may be formed in the film by decomposition and thereby maintain a non-acid condition in the film, said alkaline material being insufficiently alkaline to react with the rubber hydrochloride or remove hydrogen chloride therefrom.

WILLIAM C. CALVERT.